United States Patent [19]

Reinhold et al.

[11] Patent Number: 5,611,473
[45] Date of Patent: Mar. 18, 1997

[54] APPARATUS FOR CONVEYING COLLAPSED, CONTINUOUS PLASTIC FILMS

[75] Inventors: Klaus Reinhold, Kroenerstrasse 3, D-49525 Lengerich i.W.; Gerd Ratz, Lienen, both of Germany; Jean-Jacques Labaig, Bernay, France

[73] Assignee: Klaus Reinhold, Lengerich, Germany

[21] Appl. No.: 417,634

[22] Filed: Apr. 6, 1995

[30] Foreign Application Priority Data

Apr. 8, 1994 [DE] Germany ............................ 9405848 U

[51] Int. Cl.⁶ .......................... B65H 20/00; B65H 23/32
[52] U.S. Cl. ........................ 226/170; 226/119; 226/171; 226/197; 425/327
[58] Field of Search ..................................... 226/119, 170, 226/171, 197, 106; 425/403.1, 327

[56] References Cited

U.S. PATENT DOCUMENTS

| | | | |
|---|---|---|---|
| 2,141,578 | 12/1938 | Wellmar | 226/170 X |
| 3,241,182 | 3/1966 | Kessler | 425/327 |
| 3,768,949 | 10/1973 | Upmeier | 425/392 |
| 4,154,386 | 5/1979 | Kawada | 226/171 X |
| 4,643,656 | 2/1987 | Karl | 425/327 X |
| 4,760,627 | 8/1988 | Schele | 425/327 X |
| 5,013,234 | 5/1991 | Reinhold | 425/327 |
| 5,320,267 | 6/1994 | Oono et al. | 226/170 |

FOREIGN PATENT DOCUMENTS 2035584 3/1972 Germany.

*Primary Examiner*—Michael Mansen
*Attorney, Agent, or Firm*—Jordan and Hamburg

[57] ABSTRACT

Apparatus for conveying continuous collapsed film includes a guidance arrangement receiving the continuous collapsed film, the guidance arrangement including at least one guide roller and at least one turning bar for guiding the film. The at least one guide roller changes the direction of the film 180 degrees, and the at least one turning bar changes the direction of the film 180 degrees. A conveyor belt travels the same speed as the film and the conveyor belt and the film loop over the one turning bar in superimposed relationship with the conveyor belt being between the at least one turning bar and the film such that the conveyor belt carries the film during the looping over the at least one turning bar.

43 Claims, 7 Drawing Sheets

APPARATUS FOR CONVEYING COLLAPSED, CONTINUOUS PLASTIC FILMS

BACKGROUND OF THE INVENTION

The invention relates to an apparatus for conveying collapsed plastic films.

Known apparatus for conveying plastic films with a guiding system work satisfactorily only when the plastic films, extruded, for example, as a continuous tube, have certain properties. These include, in particular, a smooth surface and a small thickness, which does not disadvantageously affect the flexibility of the continuous film, so that the continuous film, such as, in particular, a collapsed, continuous blown film can be passed in an orderly manner under changing horizontal angles of approach and departure about the turning bars, which usually are held in the rack of the apparatus in such a manner that they do not rotate. It follows from this that particularly those plastic films, which have an external dull or tacky surface, are not suitable for being handled in the known guiding systems. Examples of such films are rubber-like films or collapsed films or blown films, which are produced by the coextrusion method, the one or external layer of which consists, for example, of an ethylene vinyl acetate copolymer (EVA), while the other or internal layer of which is formed from a non-tacky or smooth plastic in the form of a conventional polyolefin such as polyethylene. Such films are used, for example, in the case of a blown film, after the collapsed, continuous blown film has been slit, as surface-protection films, which are glued with their tacky side onto the objects that are to be protected. However, plastic films, which have a greater thickness or are made from a material that imparts stiffness, collapsed, continuous films of which are difficult to guide around the turning bars, are included among those, which are unsuitable for the known guiding systems.

In all of these cases, the continuous film experiences strains and stresses to such an extent at the turning bar, that it cannot be passed through the guiding system without being damaged. This can also not be remedied in the case of turning bars constructed as so-called air turning bars, by intensifying more and more the cushion of air produced by the usual row of air nozzles, since the guiding accuracy and the fold-free and deformation-free course of the continuous film are lost in this manner.

The problems described show themselves particularly during the manufacture of continuous plastic films by the blowing method, in which permissible variations in the thickness of the film wall arise, for example, because of the usual permissible manufacturing variations in the blown film die of the extruder used to produce the film, in the calibration equipment traversed after the extrusion process by the continuous blown film with expanded circular cross section, as a result of the internal and external cooling or as a result of other external circumstances. When such continuous blown films are wound up in the collapsed state in reeling equipment, annular tings would be formed in the reeled film due to the addition of permissible variations in the thickness, unless countermeasures are taken. These annular rings would result in a lasting deformation of the film in this region and would make it difficult to print on the continuous blown film and to process this film further.

So-called reversing take-off units have been developed for the continuous blown film as suitable countermeasures to prevent the formation of annular rings on the reeled film. When the continuous blown film is collapsed, the reversing system of the take-off unit causes the fold edges, which form as the continuous blown film is collapsed, to migrate periodically. This brings about a corresponding distribution of any permissible variations in thickness over the width of the collapsed blown film. During the subsequent reeling of the continuous collapsed film in reeling equipment, the formation of annular rings on the reel due to the addition of permissible variations in the thickness of the film is avoided in this manner. It is self-evident that a sufficiently large pivoting angle must be chosen for the reversing motion.

In the case of a known, reversing take-off unit of the German patent 20 35 584, the collapsing apparatus, comprising the usual nip roller rotatable about horizontal axes, reversing through an angle of about 360°, is swiveled about the axis of the continuous blown film supplied in a horizontal plane. It has been observed that this pivoting angle of a reversing motion is appropriate for the bulk of the applications of a reversing take-off unit. The reversing system comprises two guide rollers and two turning bars for deflecting the continuous blown film through an angle of about 180° while at the same time changing the direction. On the other hand, in those application cases, in which the pivoting angle of the reversing motion of the collapsing unit with its nip roller is less than 360°, a single turning bar between two guide rollers or also in conjunction with only one guide roller may also be adequate for handling the continuous blown film in the reversing system of the take-off unit.

In the case of the known take-off unit of the German patent 20 35 584, the support for the guide rollers and the turning bars, which can be swiveled about the axis of the continuous blown film supplied, is produced in the apparatus in such a manner, that the axes of the guide rollers and of the turning bars run tangentially to the circles around the vertical axis of rotation of the collapsing unit, the guide rollers, in every possible operating position, being radially outside of the parts of the turning bars looped by the continuous blown film. The pivoting angles of the guide rollers and the turning bars decrease as the distance from the collapsing unit increases. The continuous blown film is guided in mutually parallel horizontal planes between the guide rollers and the turning bars and the stationary conveyor for transporting the collapsed, continuous film away. By these means, a small overall height of the reversing system is attained. Furthermore, the measure that the radius of the circle circumscribed by the pivoting path of the axes of the turning bars amounts to $\pi/4\times$ the diameter of the turning bars, counteracts any lateral running of the continuous blown film during the pivoting of the reversing system. At the same time, it is found that the intersection of these center lines of the continuous blown film strands running towards and away from the turning bar lies in the central axis of rotation of the reversing system. During the reversing pivoting motion, it is thus ensured that the continuous blown-film strands open and close in scissors fashion about the axis of rotation so that, theoretically, identical symmetrically opposite fictional forces act on the two strands of continuous blown film and, by the very concept, axial shifting of the continuous blown film on the turning bars during the reversing operation is avoided as a result of the frictional forces acting on one side.

SUMMARY OF THE INVENTION

The primary object of the invention is to provide an apparatus for conveying continuous collapsed plastic film with a guiding system of the initially-given type, for which the guiding system is also suitable for handling plastic films, the surface of which represents a problem, and/or those plastic films having a limited flexibility.

For this refinement, a supporting unit for the continuous collapsed film is included in the guiding system and comprises an endless conveyor belt revolving at the conveying speed of the continuous collapsed film. When the inventive apparatus is being operated, the conveyor belt, together with the continuous, collapsed film, loops the first, or, in the case of several turning reds, each turning rod, in such a manner, that the conveyor belt carries the continuous, collapsed film with its side averted from the turning bar, that is, on the outside. This means that the continuous collapsed film does not come into engagement at all during the looping with its tacky or dull exterior surface with the stationary turning bar held in the apparatus rack and the orderly, frictionless guiding process of the continuous collapsed film about the turning bar depends only on the surface nature and the flexibility of the conveyor belt. In this way, the conveyor belt, once brought into engagement with the continuous collapsed film, necessarily carries along also those continuous collapsed films during its controlled revolving motion about the respective turning bar, which have a decreased flexibility due to the material, from which they are constructed.

To fulfill the necessary parameters, particularly with respect to the surface nature and flexibility, the conveyor belt itself can be produced from available suitable materials. Conventional conveyor belts of, for example, comprising a two-layer fabric with a smooth silicone layer as surface, can be recommended. Since the conveyor belt necessarily is wider than the continuous collapsed film accommodated by it for looping around a turning bar, it is furthermore advisable to select a width for the conveyor belt, which corresponds to the maximum working width of the take-off unit, so that practically all width of collapsed film, which are processed, can be accommodated by the conveyor belt.

The inventive guiding system functions in stationary systems, in which the continuous collapsed film is to be guided constantly only at one desired angle, as well as in reversing systems, in which the continuous collapsed film is caused to approach with, in each case, changing angles in relation to the longitudinal axis of the turning bar.

In a further, preferred refinement and application of the invention, the inventive apparatus can therefore form a part of the take-off unit for continuous plastic blown films produced by an extruder with a stationarily disposed blown film die and is disposed subsequent to a collapsing unit for the continuous blown film that is supplied with an expanded circular cross section, in order to transport the continuous, collapsed blown film to a stationary reeling unit and the guiding system is constructed as a reversing system, which is disposed between the collapsing unit and the stationary reeling unit and is pivotably supported in an apparatus rack. Regardless of the driving mechanism for the reversing, which is integrated in the inventive conveyor belt, the orderly, frictionless guiding process of the collapsed continuous blown film about the turning bar or bars, which are approached with, in each case, changing angles in relation to the longitudinal axis of the turning bars, takes place here by means of the conveyor belt determining the guiding process about the turning bar or bars. At the same time, the kinematics of the reversing system of the German patent 20 35 584 and the thereby attained controlled guidance of the continuous blown film from a stationary, continuous blown film die by the reversing system to a, in turn, stationary reeling unit is retained.

In a further refinement of the invention, which can be used, in principle, with the stationary as well as with the reversing guiding system, the conveyor belt advantageously is divided into two individual conveyor belts, which are held above one another in the guiding system in mirror-image, symmetrical arrangement on either side of a horizontal plane containing the axis of rotation of the further guide roller lying next to the first guide roller. In the event of possible damage to the conveyor belt, it is not necessary here to exchange the whole length of this belt. This can make the work considerably easier, particularly in the case of reversing guiding systems.

Numerous further distinguishing features and advantages of the invention arise out of the dependent claims and the specification below in conjunction with the drawings, in which a preferred embodiment of the object of the invention is shown diagrammatically in the form of a reversing take-off unit for collapsed, continuous, plastic, blown films.

DESCRIPTION OF THE PREFERRED EMBODIMENT

Figure 1:
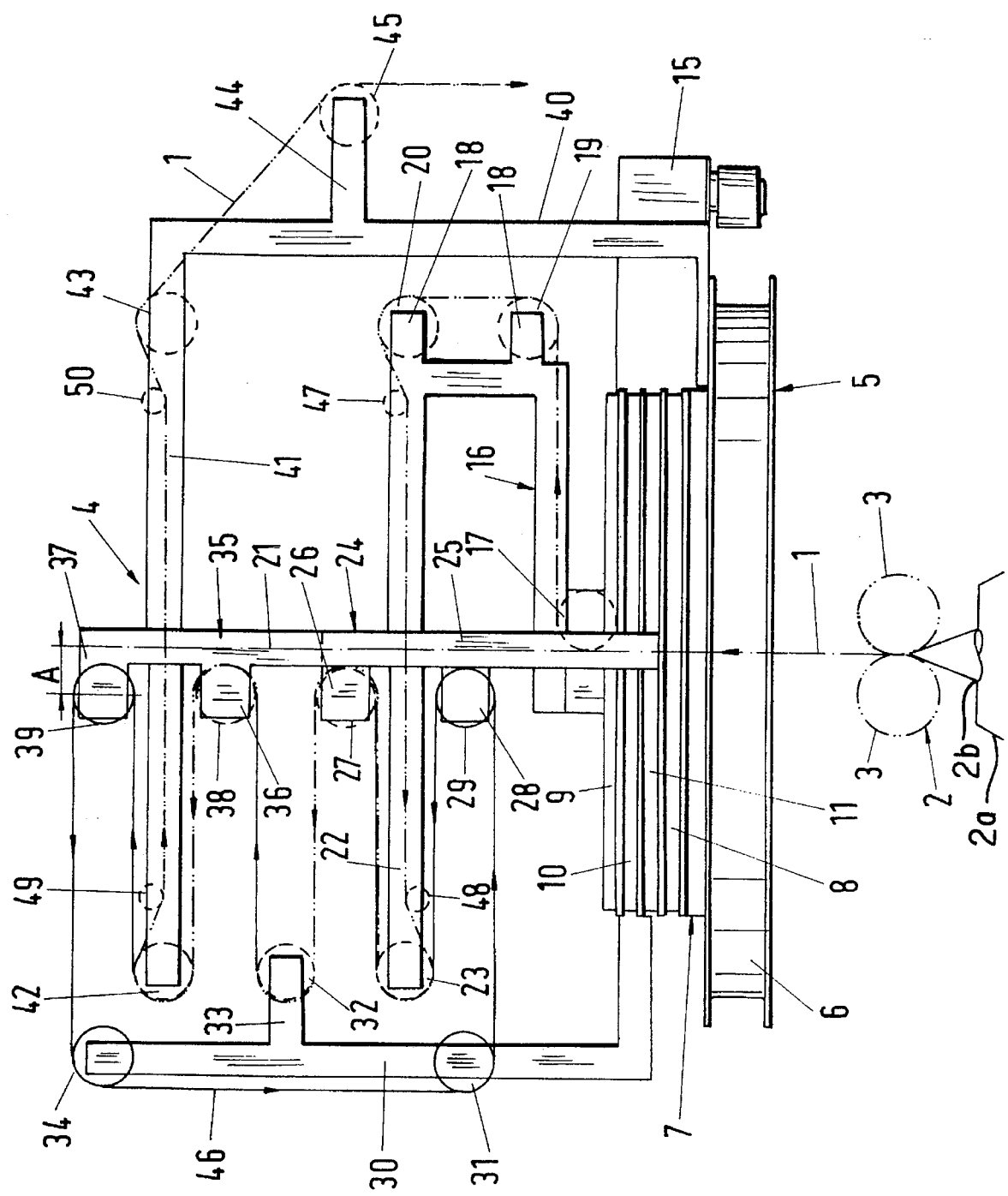
FIG. 1 shows a front view of a reversing take-off unit for continuous, blown plastic film in the 0° position of the collapsing unit.

A continuous, blown plastic film 1 is supplied from an extruder 2a with a stationary blown film die (26) with an expanded round or circular cross section to a collapsing unit, which is labeled 2 as a whole and is represented in the drawing only by two nip rollers 3, each of which is rotatable about a horizontal axis. The continuous, blown film 1, collapsed between the nip rollers 3, is supplied over a reversing, take-off unit, which is labeled 4 as a whole, to a reeling unit (not shown), on which the collapsed, continuous blown film 1 is reeled up into a storage reel. The continuous blown film 1 is passed in a vertical direction from the blown film die of the extruder over a larger distance, required for cooling and solidifying the plastic film, in the upwards direction to the take-off unit 4, which accordingly is usually disposed in the region of the ceiling of an appropriate production area.

The take-off unit 4 comprises a rack, which is labeled 5 as a whole and of which only an upper bearing frame 6 for supporting a horizontal live ring package 7 is shown in the drawing. The live ring package 7 is composed of individual live rings 8, 9, 10, 11, which are disposed one over the other and have identical internal and external diameters. The live rings 8, 9, 10 and 11 are supported directly on one another over interposed roll bodies and form a thrust bearing stressed in compression. The live rings 8 to 11 rest freely rotatably on one another and can be rotated at will relative to one another. Unwanted transverse motions of the individual live rings 8 to 11 in the live ring packet 7 in horizontal planes are practically excluded here.

The live rings 8 to 11 are driven at different speeds by means of a driving motor, which is labeled 15 as a whole and which comprises an appropriate reversing mechanism for the individual live rings 8 to 11, which are in driving connection over a slaving unit provided at their external periphery, for example, an external gearing with a corresponding slaving unit of the reversing mechanism. The live ring 8 experiences over the reversing gearing a reversing pivoting motion of 360°, that is, of ±180° starting out from a middle position or 0° of the collapsing unit 2, with the reversing unit 4, as is evident from FIGS. 1 and 2. Based on this middle position, the live ring 9 obtains a reversing motion of ±135°, corresponding to a total of 270°, the live ring 10 obtains a reversing motion of ±90°, corresponding to a total of 180°, and live ring 11 obtains a reversing motion of ±45°, corresponding to a total of 90°.

A holder 16, in which a guide roller 17 is mounted in the upper end region of the live ring package 7 so as to be freely rotatable within the cylindrical enveloping, surface plane of the live ring package 7, is fastened at the live ring 8. Moreover, two guide rollers 19 and 20 are mounted, so as to be rotatable each about a horizontal axis, in two horizontal arms 18 of the holder 16, the guide rollers 19 and 20 being disposed with their axis of rotation in a common, vertical plane. The holder 16 furthermore, in the position opposite to the upper horizontal arm 18, has a horizontal arm 22, which extends beyond the vertical, central axis of rotation 21 of the take-off unit 4 and carries at its free end a further guide roller 23, which is freely rotatable.

A further holder 24 is fastened with a central, perpendicular part 25 to the live ring 9. A first air turning bar 27 is mounted at an upper horizontal arm 26 and a further air turning arm 29 is mounted at a horizontal arm 28, which is mounted at a distance below. Both air turning bars 27 and 29 are mounted so that they cannot rotate.

A holder 30 is fastened to the live ring 10. A lower guide roller 31 is rotatably supported in the holder 30 in the same horizontal plane as the turning bar 29, a middle guide roller 32 is rotatably supported at a horizontal arm 33 in the holder 30 and an upper guide roller 34 is rotatably supported in the holder 30 in the upper end region of the holder 30.

A further holder 35, which in the 0° position of the reversing system, is in alignment with the holder 24, is fastened to the live ring 11 and has two horizontal arms 36 and 37, which are disposed vertically above one another and in each of which a turning bar 38 or 39 is held so that it cannot rotate.

Finally, the take-off unit comprises a holder 40, which is fastened to the upper frame 6 of the rack 5 and therefore, as a stationary component, does not execute any reversing motion. In an upper horizontal part 41, two guide rollers 42 and 43 are mounted freely rotatably at equal distances on either side of the vertical axis of rotation 21 in a common horizontal plane between the horizontal planes of the turning bars 38 and 39.

Furthermore, at an outwardly directed horizontal arm 44, a guide roller 45 is mounted freely rotatably, from which the continuous blown film 1 is passed in a manner, the details of which are not shown, to the reeling unit. In order to support the guiding elements held by them, all holders or arms are constructed in double-arm fashion at their two ends.

So that, also, those collapsed, blown, plastic films, which have a tacky or dull outer surface or are relatively stiff, can also be taken off by means of the take-off unit 4 in reverse operation, a conveyor belt 46 is integrated in the reversing system of the take-off unit 4. This conveyor belt 46 is guided over a pair of its own guiding elements 31, 29, 34, 39 in a horizontal plane below and in a horizontal plane above the horizontal planes occupied by the first guide roller 23 and the first turning bar 27 for the continuous blown film 1.

The pairs of guide elements 31, 29 or 34, 39 for the conveyor belt 46 consist in each case of the guide roller 31 or 34 and the turning bar 29 or 39. These turning bars 29, 39, which are provided exclusively for guiding the conveyor belt within the reversing system, are disposed in the 0° position of the reversing system in a common vertical plane, in which the turning bars 27 and 38 for guiding the continuous blown film are also contained. In the same manner, the guiding rollers 31 and 34, which are provided exclusively for guiding the conveyor belt, are disposed in a common vertical plane, which however, in the 0° position of the reversing system, is offset towards the outside from the vertical plane occupied by the guide rollers 23, 32 and 42 for the continuous, blown film 1. One of the two guide rollers 31, 34, for example, the guide roller 34, is used in a manner, the details of which are not shown, for driving the conveyor belt 46 with a rotational speed corresponding to the take-off or conveying speed of the continuous, blown film 1.

Because its guiding elements, 29, 31, 34 and 39 are supported in the holders 25, 30 and 35 of the reversing system, in which also the corresponding guiding elements for the continuous, blown film 1 are also supported, the endless conveyor belt 46, just as the continuous blown film 1, carries out the respective rotating motions, imparted by the holders 25, 30 and 35, about the vertical axis 21 of the system. The horizontal lower and upper strands of the conveyor belt 46 limit the space, in which the guide rollers 23, 32 and 42, as well as the turning bars 27 and 38 for guiding the continuous blown film are disposed.

After the continuous blown film 1 has left the nip rollers 3 of the collapsing unit 2, which are connected in a manner, not shown in detail, also with the live ring 8, just as is the holder 16, for a similar reversing motion, it passes over the guide roller 17, the outer periphery of which adjoins at its side averted from the guide roller 19 the vertical axis of rotation 21 of the reversing system, and then runs over the guide roller 19 and the guide roller 20 to the guide roller 23. The guide rollers 19 and 20 form an extension of the path taken by the continuous, blown film 1 as it enters the reversing system. This extension avoids regions of interference resulting from the inclusion of the conveyor belt 46 with its turning bars 29 and 30. The path-extending guide roller 19, just as the guide roller 20 that extends the path further, is disposed at the same horizontal distance from the vertical axis of rotation 21 of the reversing system as the guide rollers 23, 32 and 42; however, this distance can also be larger.

Figure 2:
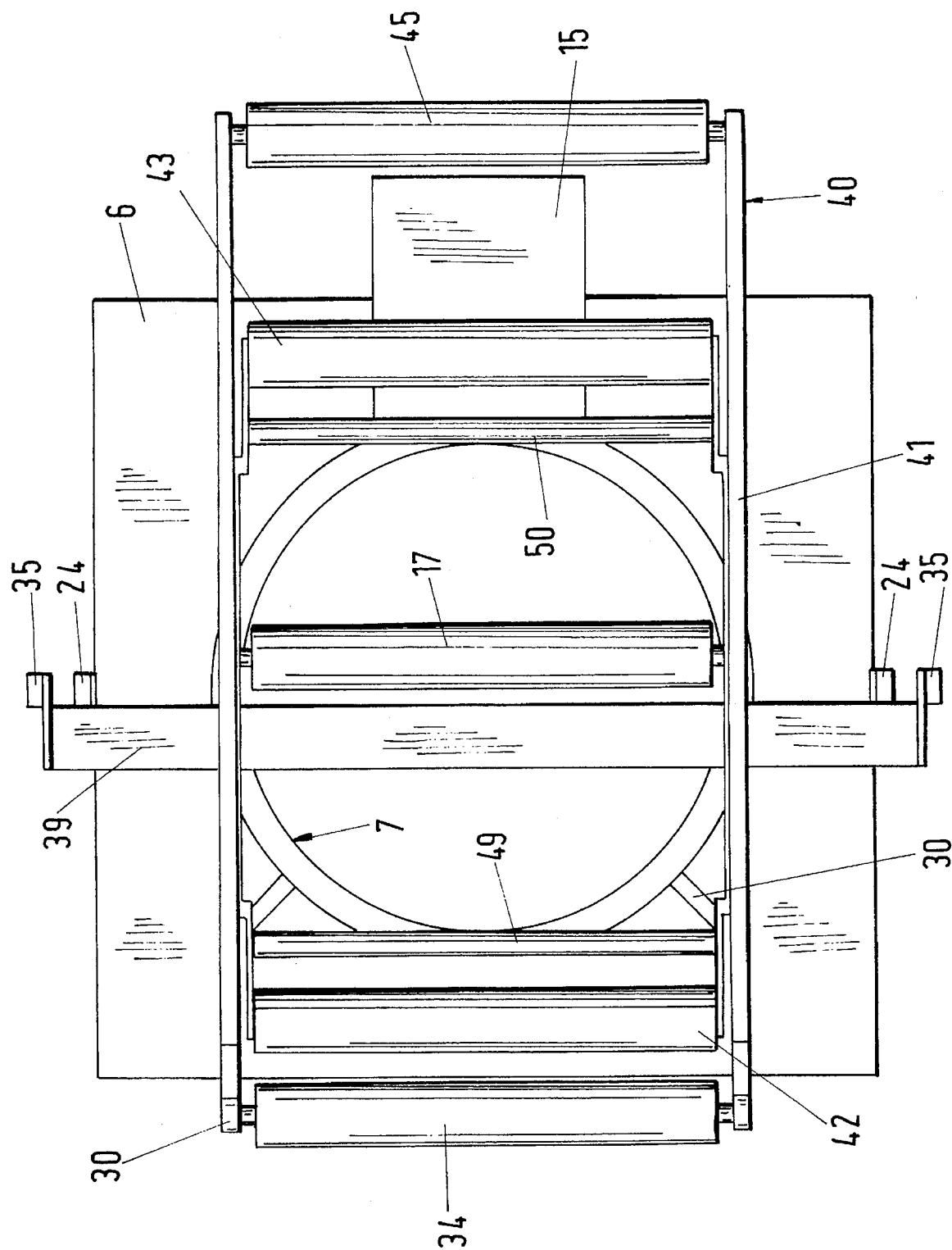
FIG. 2 shows a plan view of the apparatus of FIG. 1, once again in the 0° position of the collapsing unit.
Figure 3:
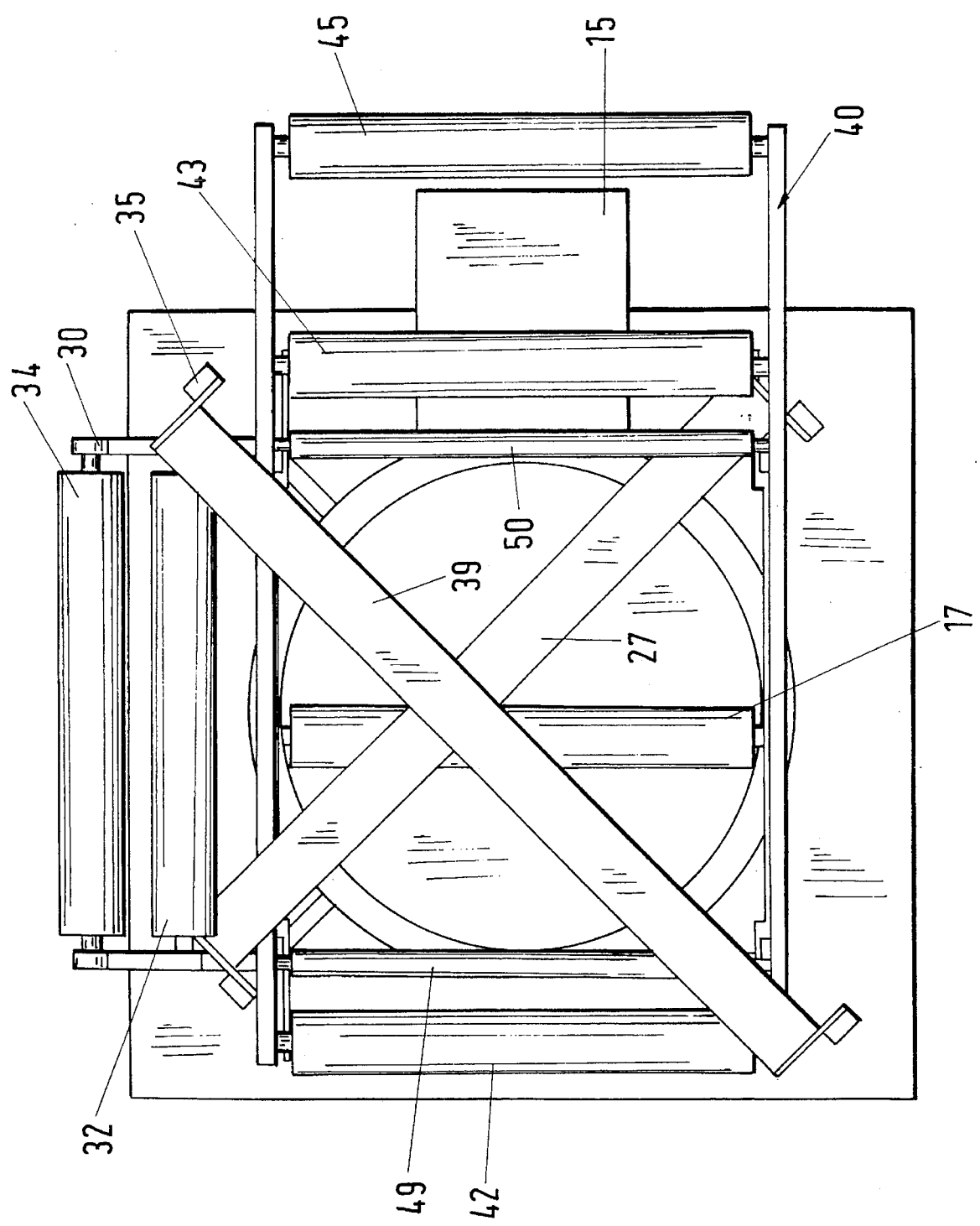
FIG. 3 shows a representation corresponding to that of FIG. 2, however in the −180° position of the collapsing unit.
Figure 4:
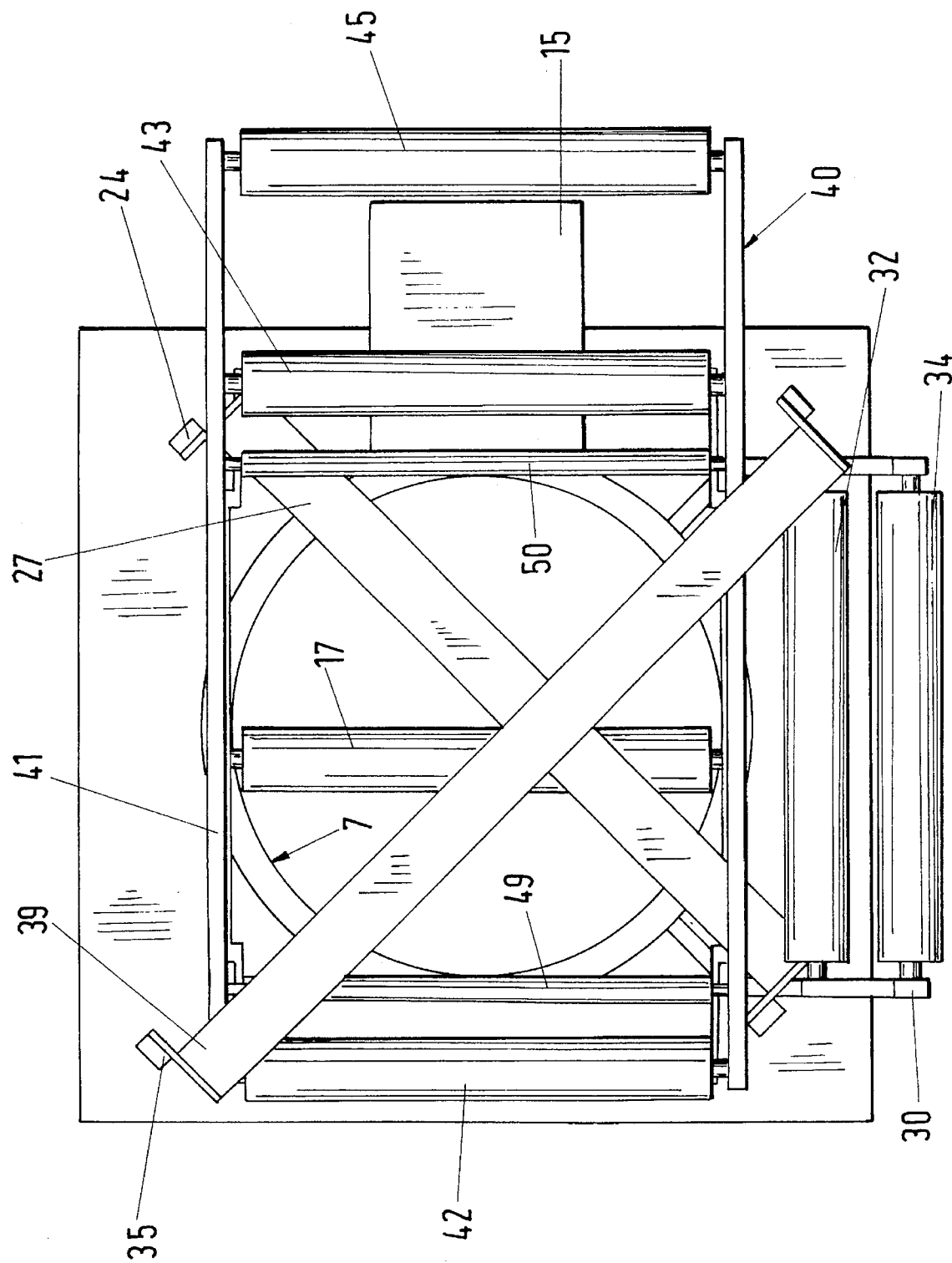
FIG. 4 shows a representation corresponding to that of FIGS. 2 and 3, however in the +180° position of the collapsing unit.
Figure 5:
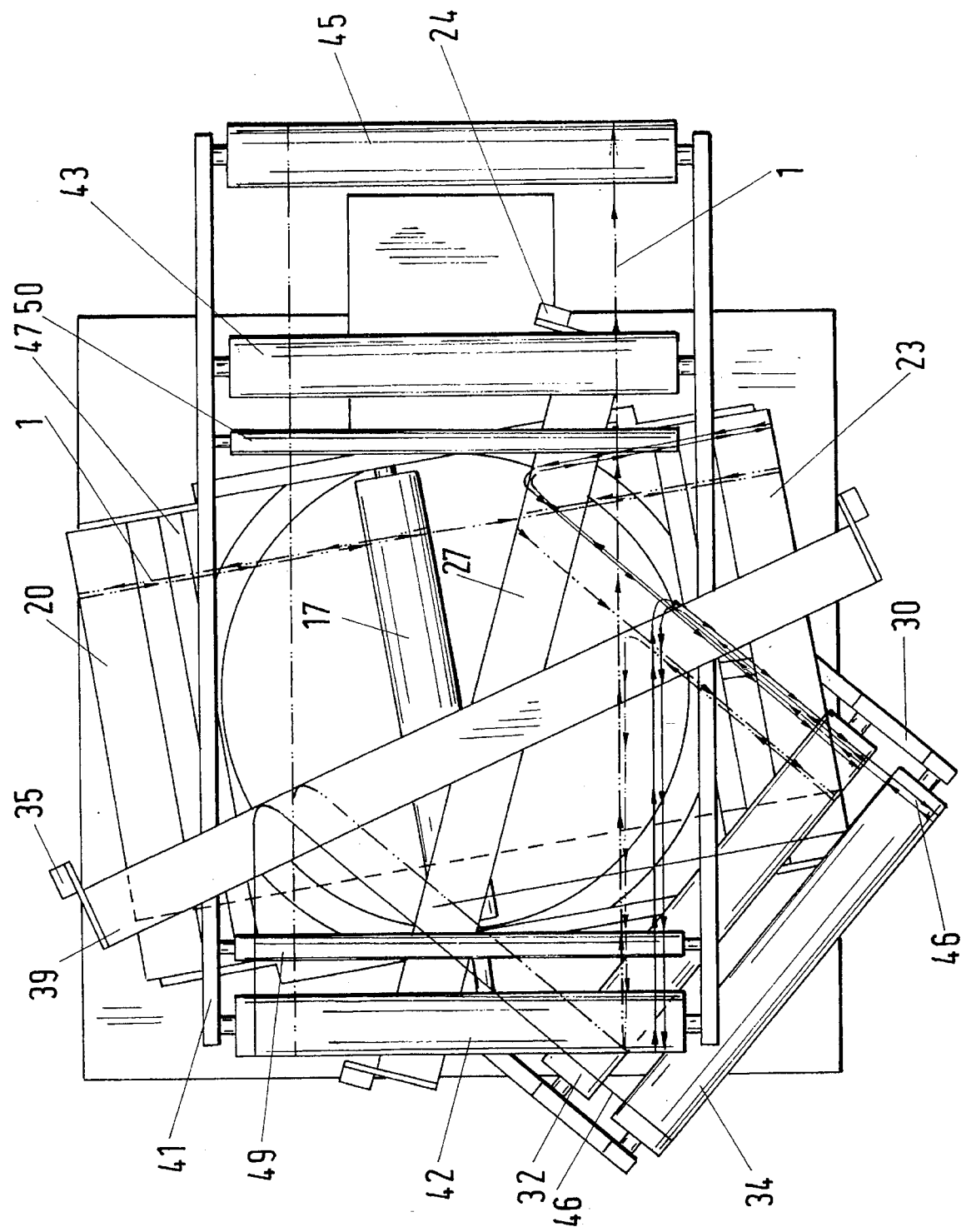
FIG. 5 shows a representation corresponding to that of FIGS. 2, 3 and 4, however in the +100° position of the collapsing unit.

However, before the continuous, blown film 1 loops the guide roller 23, it is brought into supporting proximity with the conveyor belt 46 which, in the running section preceding the guide roller 23, runs in the same direction (and at the same speed) as the collapsed blown film 1, as illustrated by the guiding arrows of the collapsed blown film 1 and of the conveyor belt 46 in FIG. 1. By means of deflection rollers 47 and 48 rotatably mounted in the horizontal arm 22 of the holder 16, the continuous, blown film 1 is brought into a running direction approximately parallel to that of the conveyor belt 46, in order, after passing through the deflector roller 48, to loop the guide roller 23 in the same manner as the conveyor belt 46. During the looping of the guide roller 23, the continuous, blown film 1 is held between the outer periphery of said guide roller 23 and the conveyor belt 46. As the conveyor belt 46 and the continuous, blown film 1 move jointly to the turning bar 27, the continuous, blown film 1 lies on the outside of the conveyor belt 46 during the looping of the turning bar 27, so that the continuous blown film 1 has no contact with the peripheral surface of the turning bar 27. The surface properties or the bending behavior of the continuous, blown film 1 can thus not have (a disadvantageous) effect on the guiding around the mining bar 27.

The continuous, blown film 1 then moves on into supportive proximity with the conveyor belt 46 about the guide roller 32, then about the turning bar 38 and thereupon about the guide roller 42 in the manner described with respect to the guide roller 23 or the turning bar 27, in order, immediately after the guidance around the guide roller 42, to be brought with the help of a guide roller 49, which is rotatably mounted in the arm 41 of the holder 40, out of engagement with the conveyor belt 46 and, after passing through a further deflector roller 50, rotatably mounted in the arm 41, to be supplied over guide roller 43 and 45 to the driven reeling unit, while the conveyor belt 46, brought out of engagement with the continuous, blown film 1, is passed over the turning bar 39 to the guide roller 34, in order to be passed over the lower guide roller 31 and the lower turning bar 29 back to the first guide roller 23 for the common looping of a continuous, blow film 1 and conveyor belt 46.

Figure 6:
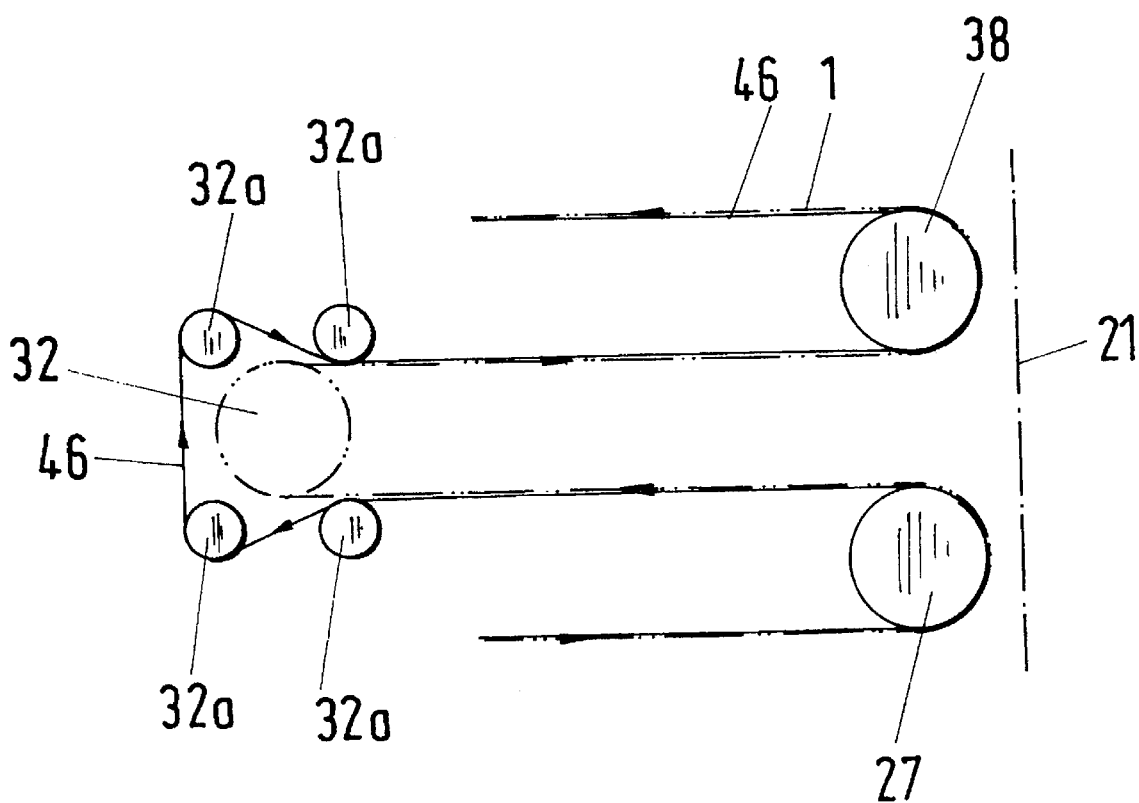
FIG. 6 shows a detail of the reversing system in a representation corresponding to that of FIG. 1, to illustrate a modification

Owing to the fact that the continuous blown film 1 is held during the looping of the guide rollers 23, 32 and 42 between their outer periphery and the conveyor belt 46, undesirable surface changes, such as wrinkling, can occur due to a squeezing action in the continuous blown film, if the film is sensitive. This is avoided by a modification illustrated in FIG. 6. FIG. 6 shows a section of the take-off unit 4, comprising the turning bars 27 and 38 and the guide roller 32. This section is limited to the diagrammatic representation of the guide elements 27, 32, 38 with the continuous, blown film 1 and the conveyor belt 46.

As shown by FIG. 6, consecutive deflecting guide rollers 32a are assigned to the guide roller 32 in the conveying direction indicated by the arrows. Said deflection rollers 32a specify a path to the conveyor belt 46, which passes without contact around guide roller 32, which is looped only by the continuous, blown film 1. By means of the deflector roller 32a, which is the last one in the running direction, the conveyor belt 46 is once again brought up to the continuous, blown film 1 to bring about supportive proximity. The conveyor belt 46 and the continuous, blown film 1 then jointly and synchronously loop around the turning bar 38 in the manner already described without contact between the continuous blown film 1 and the turning bar 38.

It is self-evident that the outer guidance of the conveyor belt 46 about the guide roller 32 can be undertaken with the help of the deflection roller 32a in the same form for the guide rollers 23 and 42, with the deviation in the case of the upper guide roller 42 that the last, in the running direction of the conveyor belt 46, deflection roller 32a is missing, since the conveyor belt 46 and the continuous, blown film 1 are not brought together once again in this region, but instead are passed on separately along the paths described.

Figure 7:
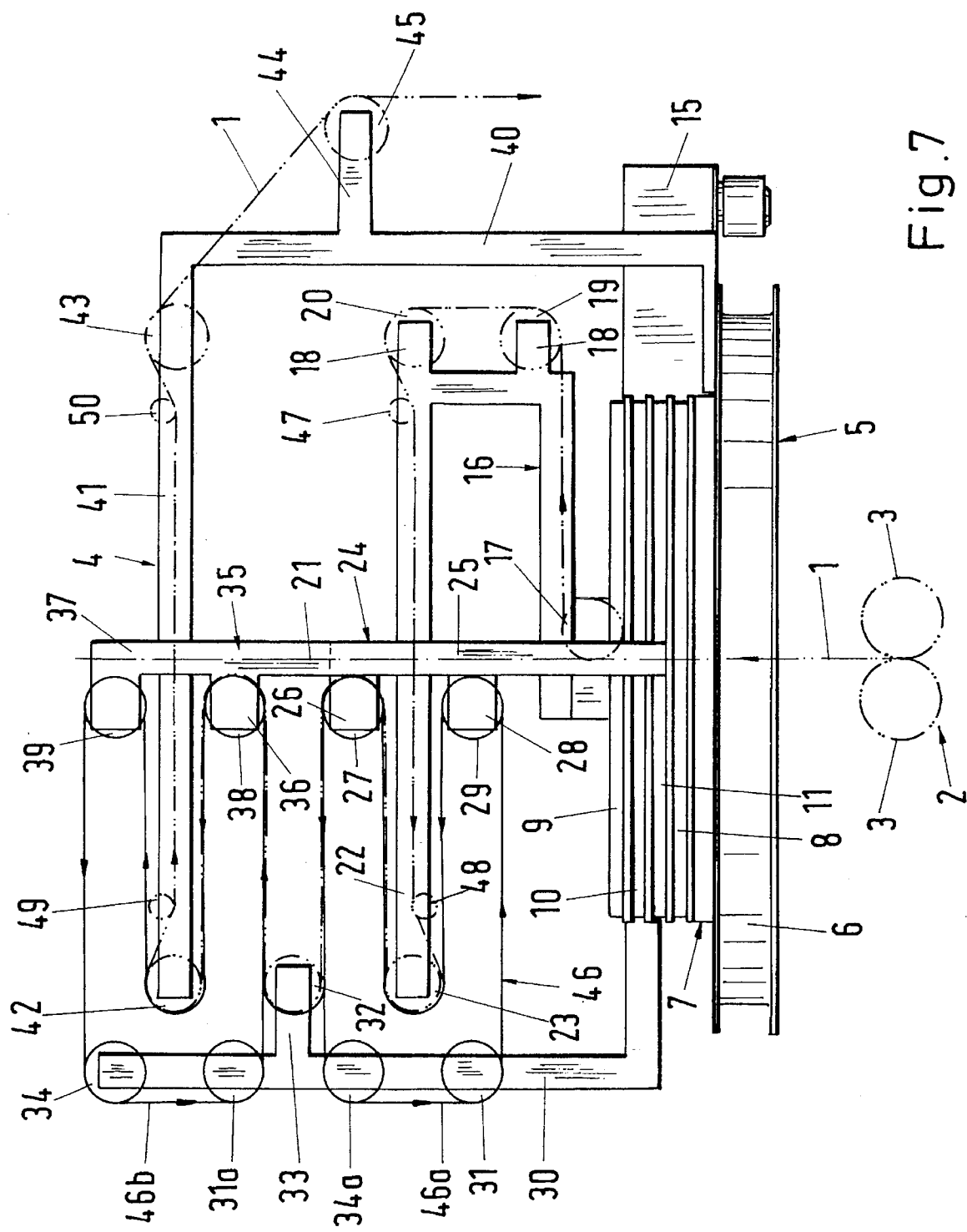
FIG. 7 shows a view corresponding to that of FIG. 1, to illustrate a further modification.

In the case of the modified embodiment shown in FIG. 7, the conveyor belt 46 is divided into two individual conveyor belts 46a and 46b, which makes it easier to exchange belts.

Theoretically, more than two individual conveyor belts can also be disposed over one another in the guiding and reversing system; however, the number is limited by practical, structural considerations. In accordance with the representation in FIG. 7, the two individual conveyor belts 46a and 46b are supported over one another in the guiding system in a symmetrical, mirror image arrangement on either side of a horizontal plane, which contains the horizontal axis of rotation of the further guiding roller 32 lying next to the first guiding roller 23.

The vertical distance between the lower and the upper individual conveyor belts 46a, 46b corresponds to the diameter of the further guiding roller 32. For their independent circulation, the individual conveyor belts 46a and 46b have, compared to the one-part conveyor belt 46, in each case an additional, own guiding roller 34a and 31a respectively. Both guiding rollers 34a and 31a are in each case rotatably supported in the holder 30 in a horizontal plane containing the first turning bar 27 or the further turning bar 38 in such a way, that, as in the case of the example described above, the continuous collapsed film 1 passes horizontally between its guiding elements, namely the guiding rollers 23, 32, 42 on the one hand and the turning bars 27, 38 on the other.

Each individual conveyor belt 46a, 46b can, moreover, be driven separately over one of its own guide roller 31, 34a or 31a, 34, in order to impart in each case a revolving speed corresponding to the conveying or take-off speed of the continuous collapsed film I to the individual conveyor belts 46a, 46b. Preferably, the guiding roller 34a is used to drive the individual conveyor belt 46a and the guiding roller 34 is used to drive the individual conveyor belt 46b.

In the case of the embodiment of FIG. 7, the course of the collapsed film 1 through the take-off unit 4 corresponds exactly to the course of the embodiment of FIGS. 1 to 6, while the individual conveyor belt 46a runs around its own guiding elements 34a, 31, 29 and 27 with inclusion of the first guiding roller 23 and the individual conveyor belt 46b runs around its guiding elements 34, 31a, 38 and 39 with inclusion of the further turning bar 42. It is understood that, in other respects, the embodiment of FIG. 7 corresponds to the one previously described. This is expressed by the use of the same reference symbols for the same or corresponding parts.

Since the turning bars 27 and 38, like the turning bars 29 and 39, do not have to guide the continuous, blown film 1 and therefore do not have to take into consideration their respective nature for an orderly guidance with changing horizontal angles of approach and departure during the guiding process, but only have to conduct the appropriately selected conveyor belt, the material properties of which are known, in a supportive manner during the guiding process, there is a greater freedom in designing the construction of the nonrotatingly installed turning bars. These can therefore consist of simple bars with a circular cross section of a suitable plastic material or of a metal or of so-called, known air turning bars. It is also possible to use other mechanical turning bars, such as axial roller cylinders with small rollers or tubular bodies with radially mounted ball casters, which are disposed at the shell of the cylinder, roll in the axial direction of the cylinder and impart axial and radial motions to the conveyor belt 46.

All turning bars, 29, 27, 38, 39, moreover have a basic position at a distance A from the vertical axis of rotation of the take-off unit 4 or the live ring package 7, as can be seen particularly in FIG. 1. This distance A corresponds to the radius of a circle circumscribed about the axis of rotation 21 by the rotating path of the axes of the turning bars 29, 27, 38, 39 in reversing operation and is calculated from the formula turning bar diameter×π/4. It is moreover understood that all the turning bars 29, 27, 38, 39 must be long enough to be able to accommodate the continuous, blown film 1, their maximum inclination of 45° for the preferred example shown also determining the arrangement of the guide rollers 23, 32, 42, as is well known to those skilled in the art.

In operation, the continuous, blown film 1, collapsed between the nip rollers 3, is passed reversingly with involvement of the conveyor belt 46 through the take-off unit 4. The guidance of the collapsed, blown film 1 and of the conveyor belt 46 is shown for the-mid-position or ±0° position of the reversing system in FIGS. 1 and 7 and for an intermediate position, in which the collapsing unit 2 with the nip rollers 3 has passed through a pivoting angle of +100°, in FIG. 5, with a dotted line for the collapsed, blown film 1 and with a solid line for the conveyor belt 46. It is evident that the collapsed, blown film 1 and the conveyor belt 46 are passed between the guide rollers 23, 32, 42 and the turning bars 29, 27, 38, 39 alternately outward and inward to the axis of rotation 21 of the reversing system, the continuous, blown film 1 and the conveyor belt 46 being passed from one horizontal plane to the next, with the result that the thickness tolerance of the plastic film are distributed uniformly according to the well known reversing system.

What is claimed is:

1. Apparatus for conveying continuous collapsed film comprising a guidance means adapted to receive said continuous collapsed film, said guidance means comprising at least one guide roller and a first turning bar for guiding said film, said at least one guide roller changing the direction of the film 180 degrees, said first turning bar changing the direction of the film 180 degrees, conveyor belt means having a conveyor belt which travels the same speed as said film, said conveyor belt and said film looping over said first turning bar in superimposed relationship with said conveyor belt being between said first turning bar and said film such that said conveyor belt carries said film during said looping over said first turning bar, rotatable means on which said guidance means and said conveyor belt means are mounted for rotating said guidance means and said conveyor belt means about an axis of rotation, said rotatable means comprising first holder means rotatable about said axis, said at least one guide roller being mounted on said first holder means, said rotatable means comprising second holder means rotatable about said axis, said first turning bar being mounted on said second holder means, and a second turning bar on said second holder means, said conveyor belt passing over said second turning bar.

2. Apparatus according to claim 1 wherein said guidance means comprises superimposing means disposed upstream of said first turning bar (27) for disposing said film and said conveyor belt in superimposed relationship such that said conveyor belt and said film are in said superimposed relationship prior to reaching said first turning bar.

3. Apparatus according to claim 1 wherein said conveyor belt has one horizontal belt portion extending between said first guide roller (23) and said first turning bar, said conveyor belt means comprising a plurality of belt guide elements for guiding said belt about an endless path of travel, said conveyor belt having one horizontal belt section overlying said one horizontal belt portion, said conveyor belt having another horizontal belt section underlying said one horizontal belt portion.

4. Apparatus according to claim 3 wherein said conveyor belt means comprises drive means for driving said conveyor belt along said endless path of travel.

5. Apparatus for conveying continuous collapsed film comprising a guidance means receiving said continuous collapsed film, said guidance means comprising a first guide roller and at least one turning bar for guiding said film, said first guide roller changing the direction of the film 180 degrees, said at least one turning bar changing the direction of the film 180 degrees, conveyor belt means having a conveyor belt which travels the same speed as said film, said conveyor belt and said film looping over said one turning bar in superimposed relationship with said conveyor belt being between said at least one turning bar and said film such that said conveyor belt carries said film during said looping over said at least one turning bar, rotatable means on which said guidance means and said conveyor belt means are mounted for rotating said guidance means and said conveyor belt means about an axis of rotation, said rotatable means comprising first holder means rotatable about said axis, said first guide roller being mounted on said first holder means, said rotatable means comprising second holder means rotatable about said axis, said at least one turning bar being mounted on said second holder means, and a second guide roller disposed on said first holder means, said first guide roller being spaced from and parallel to said second guide roller, said first and second guide rollers being on opposite sides of said rotatable axis.

6. Apparatus according to claim 5 wherein said first guide roller is spaced from said rotatable axis a first distance, said second guide roller (19) being spaced from said rotatable axis a second distance, said first distance being substantially equal to said second distance.

7. Apparatus according to claim 5 further comprising a third guide roller (20) mounted on said first holder means, said third guide roller (20) being spaced from and parallel to said second guide roller, said third guide roller (20) overlying said second guide roller.

8. Apparatus according to claim 7 wherein said third guide roller is disposed at the same elevation as said first guide roller.

9. Apparatus according to claim 7 further comprising a fourth guide roller (17) on said first holder means, said fourth guide roller being parallel to and spaced from said second guide roller, said fourth guide roller being disposed between said rotatable axis and said second guide roller.

10. Apparatus for conveying continuous collapsed film comprising a guidance means receiving said continuous collapsed film, said guidance means comprising at least one guide roller and at least one turning bar for guiding said film, said at least one guide roller changing the direction of the film 180 degrees, said at least one turning bar changing the direction of the film 180 degrees, conveyor belt means having a conveyor belt which travels the same speed as said film, said conveyor belt and said film looping over said one turning bar in superimposed relationship with said conveyor belt being between said at least one turning bar and said film such that said conveyor belt carries said film during said looping over said at least one turning bar, rotatable means on which said guidance means and said conveyor belt means are mounted for rotating said guidance means and said conveyor belt means about an axis of rotation, said rotatable means comprising first holder means rotatable about said axis, said at least one guide roller being mounted on said first holder means, said rotatable means comprising second holder means rotatable about said axis, said at least one turning bar being mounted on said second holder means, deflection roller means on said first holder means for precluding said conveyor belt from contacting said at least one guide roller, said deflection roller means being disposed about said at least one guide roller, said conveyor belt passing over said deflection roller means such that said conveyor belt is spaced from said at least one guide roller when said conveyor belt passes over said deflection roller means and said conveyor belt is thereby precluded from contacting said at least one guide roller, said film passing over and being in contact with said at least one guide roller.

11. Apparatus according to claim 10 wherein said deflection roller means comprises a plurality of parallel deflection rollers parallel to said at least one guide roller, said deflection roller means being spaced from one another and being spaced from said at least one guide roller.

12. Apparatus for conveying continuous collapsed film comprising a guidance means receiving said continuous collapsed film, said guidance means comprising at least one guide roller and at least one non-rotating turning bar for guiding said film, said at least one guide roller changing the direction of the film 180 degrees, said at least one turning bar changing the direction of the film 180 degrees, and conveyor belt means having a conveyor belt which travels the same speed as said film, said conveyor belt and said film looping over said one turning bar in superimposed relationship with said conveyor belt being between said at least one turning bar and said film such that said conveyor belt carries said film during said looping over said at least one turning bar.

13. Apparatus for conveying continuous collapsed film comprising a guidance means receiving said continuous collapsed film, said guidance means comprising at least one guide roller and at least one turning bar for guiding said film, said at least one guide roller changing the direction of the film 180 degrees, said at least one turning bar changing the direction of the film 180 degrees, conveyor belt means having a conveyor belt which travels the same speed as said film, said conveyor belt and said film looping over said one turning bar in superimposed relationship with said conveyor belt being between said at least one turning bar and said film such that said conveyor belt carries said film during said looping over said at least one turning bar, rotatable means on which said guidance means and said conveyor belt means are mounted for rotating said guidance means and said conveyor belt means about an axis of rotation, said rotatable means comprising first holder means rotatable about said axis, said at least one guide roller being mounted on said first holder means, said rotatable means comprising second holder means rotatable about said axis, said at least one turning bar being mounted on said second holder means, said rotatable means comprising third holder means rotatable about said axis, a belt turning bar mounted on said third holder means, said rotatable means further comprising fourth holder means rotatable about said axis, and a plurality of belt guide elements mounted on said fourth holder means.

14. Apparatus according to claim 13 wherein said rotating means comprises sub-section means for each of said first, second, third and fourth holder means for rotating each of said first, second, third and fourth holder means to different rotatable positions.

15. Apparatus according to claim 13 wherein said rotatable axis is vertically disposed.

16. Apparatus according to claim 13, further comprising another belt turning bar on said second holder means, said conveyor belt passing over said other belt turning bar, said rotatable means having a first rotatable position (FIG. 1), the first said belt turning bar and said other belt turning bar being disposed parallel to one another and in vertical alignment when said rotatable means is in said first rotatable position such that the first said belt turning bar and said other belt turning bar guide said belt in a common vertical plane, said at least one turning bar being parallel to and in vertical alignment with the first said belt turning bar and said other belt turning bar when said rotatable means is in said first rotatable position, said one turning bar guiding said conveyor belt and said film in said common vertical plane.

17. Apparatus according to claim 16 wherein the first said belt turning bar and said other belt turning bar are used exclusively for guiding said conveyor belt.

18. Apparatus according to claim 13 wherein at least two of said belt guide elements are disposed one above the other on said fourth holder means, said conveyor belt having a vertical belt portion extending between said two belt guide elements, said two belt guide elements being used exclusively for guiding said belt, said vertical belt portion being disposed further radially outwardly of said axis than said at least one guide roller.

19. Apparatus according to claim 13 further comprising a first deflection roller (48) on said first holder means, said first deflection roller deflecting said film onto said at least one guide roller as said belt passes onto said at least one guide roller such that said film and said belt pass together in superimposed relationship over said at least one guide roller, a stationary holder juxtaposed to said rotatable means, an operable guide roller and a second deflection roller mounted on said stationary holder, said film passing over said operable guide roller and then passing onto one side of said second deflection roller, said belt passing over said operable guide roller and then past an opposite side of said second deflection roller, whereby the film and belt are separated.

20. Apparatus according to claim 13 further comprising a stationary holder means juxtaposed to said guidance means, a direction guide roller on said stationary holder means, an operating holding bar on said third holder means, an operating guide roller on said fourth holder means, and a direction belt turning bar on said second holder means, said belt traveling over an endless path which includes said belt guide elements, said direction belt turning bar, said at least one guide roller, said at least one turning bar, said operating guide roller, said operating holding bar, said direction guide roller, and said belt turning bar.

21. Apparatus according to claim 20 wherein said at least one guide roll is designated a first guide roller, further comprising a plurality of further film guide elements on said first holder means in addition to said first guide roller, a film guide element on said stationary holder means, said film traveling along a path which includes said further film guide elements, said first guide roller, said at least one turning bar, said operating guide roller, said operating holding bar, said direction guide roller, and said film guide element.

22. Apparatus according to claim 13 further comprising an operating guide roller mounted on said fourth holder means, an operating turning bar mounted on said third holder means, said belt and said film passing from said at least one turning bar to said operating guide roller and thence, to said operating turning bar, deflection roller means on said fourth holder means, said deflection roller means being disposed about said operating guide roller, said conveyor belt passing over said deflection roller means such that said conveyor belt is spaced from said operating guide roller when said conveyor belt passes over said deflection roller means and said conveyor belt is thereby precluded from contacting said operating guide roller, said film passing over and being in contact with said operating guide roller.

23. Apparatus according to claim 22 wherein said deflection roller means comprises a plurality of parallel deflection rollers parallel to said operating guide roller, said deflection roller being spaced from one another and each spaced from said operating guide roller.

24. Apparatus according to claim 13 wherein said conveyor belt is designated a first conveyor belt, a first belt turning bar on said second holder means, said first belt traveling over a first endless path about said first belt turning bar, said at least one guide roller, said at least one turning bar, and said belt guide elements.

25. Apparatus according to claim 24 further comprising a stationary holder means juxtaposed to said guidance means, an operating guide roller on said stationary holder means, said belt turning bar mounted on said third holder means being designated a first belt turning bar, a second belt turning bar on said third holder means, and a second belt traveling over a second endless path about said second belt turning bar, said operating guide roller, said first belt turning bar and said belt guide elements.

26. Apparatus according to claim 25 further comprising an intermediate guide roller on said fourth holder means, said first endless path of said first conveyor belt having an upper horizontal section, said second endless path of said second conveyor belt having a lower horizontal section parallel to said upper horizontal section, said upper horizontal section being spaced from said lower horizontal section a distance which is substantially equal to the diameter of said intermediate guide roller.

27. Apparatus according to claim 26 wherein said intermediate guide roller is disposed between said upper and lower horizontal sections, said intermediate guide roller guiding said film through an 180 degree turn of direction.

28. Apparatus according to claim 25 wherein said belt guide elements on said fourth holder means comprises a first belt guide roller horizontally aligned with said first belt turning bar, a second belt guide roller horizontally aligned with said at least one turning bar, a third belt guide roller horizontally aligned with said operating turning bar, and a fourth belt guide roller horizontally aligned with said belt turning bar.

29. Apparatus according to claim 28 wherein said first, second, third and fourth belt guide rollers are parallel to one another and vertically aligned.

30. Apparatus according to claim 25 further comprising means for separately driving each of said first and second conveyor belts about their respective first and second endless belt paths.

31. Apparatus for conveying continuous collapsed film comprising a guidance means receiving said continuous collapsed film, said guidance means comprising at least one guide roller and at least one turning bar for guiding said film, said at least one guide roller changing the direction of the film 180 degrees, said at least one turning bar changing the direction of the film 180 degrees, and conveyor belt means traveling the same speed as said film, said conveyor belt means and said film looping over said one turning bar in superimposed relationship with said conveyor belt means being between said at least one turning bar and said film such that said conveyor belt means carries said film during said looping over said at least one turning bar, and deflection roller means for precluding said conveyor belt from contacting said at least one guide roller, said deflection roller means being disposed about said at least one guide roller, said conveyor belt passing over said deflection roller means such that said conveyor belt is spaced from said at least one guide roller when said conveyor belt passes over said deflection roller means and said conveyor belt is thereby precluded from contacting said at least one guide roller, said film passing over and being in contact with said at least one guide roller.

32. Apparatus according to claim 31 wherein said deflection roller means comprises a plurality of parallel deflection rollers parallel to said at least one guide roller, said deflection roller means being spaced from one another and being spaced from said at least one guide roller.

33. Apparatus for conveying continuous collapsed film comprising a guidance means receiving said continuous collapsed film, said guidance means comprising at least one guide roller and a first turning bar for guiding said film, said at least one guide roller changing the direction of the film 180 degrees, said first turning bar changing the direction of the film 180 degrees, conveyor belt means traveling the same speed as said film, said conveyor belt means and said film looping over said first turning bar in superimposed relationship with said conveyor belt means being between said first turning bar and said film such that said conveyor belt means carries said film during said looping over said first turning bar, support means on which said guidance means is mounted, said support means comprising a first holder means, said at least one guide roller being mounted on said first holder means, said support means comprising a second holder means, said first turning bar being mounted on said second holder means, a second turning bar on said second holder means, said conveyor belt means passing over said second turning bar.

34. Apparatus for conveying continuous collapsed film comprising a guidance means receiving said continuous collapsed film, said guidance means comprising a first guide roller and at least one turning bar for guiding said film, said first guide roller changing the direction of the film 180 degrees, said at least one turning bar changing the direction of the film 180 degrees, conveyor belt means traveling the same speed as said film, said conveyor belt means and said film looping over said at least one turning bar in superimposed relationship with said conveyor means being between said at least one turning bar and said film such that said conveyor belt carries said film during said looping over said at least one turning bar, support means on which said guidance means is mounted, said support means comprising a first holder means, said first guide roller being mounted on said first holder means, said support means comprising a second holder means, said at least one turning bar being mounted on said second holder means, a second guide roller disposed on said first holder means, said first guide roller being spaced from and parallel to said second guide roller, a third guide roller mounted on said first holder means, said third guide roller being spaced from and parallel to said second guide roller, said third guide roller overlying said second guide roller.

35. Apparatus according to claim 34 wherein said third guide roller is disposed at the same elevation as said first guide roller.

36. Apparatus for conveying continuous collapsed film comprising a guidance means receiving said continuous collapsed film, said guidance means comprising at least one guide roller and at least one turning bar for guiding said film, said at least one guide roller changing the direction of the film 180 degrees, said at least one turning bar changing the direction of the film 180 degrees, conveyor belt means having a conveyor belt which travels the same speed as said film, said conveyor belt and said film looping over said one turning bar in superimposed relationship with said conveyor belt being between said at least one turning bar and said film such that said conveyor belt carries said film during said looping over said at least one turning bar, support means on which said guidance means is mounted, said support means comprising a first holder means, said at least one guide roller being mounted on said first holder means, said support means comprising a second holder means, said at least one turning bar being mounted on said second holder means, deflection roller means on said first holder means for precluding said conveyor belt from contacting said at least one guide roller, said deflection roller means being disposed about said at least one guide roller, said conveyor belt passing over said deflection roller means such that said conveyor belt is spaced from said at least one guide roller when said conveyor belt passes over said deflection roller means and said conveyor belt is thereby precluded from contacting said at least one guide roller, said film passing over and being in contact with said at least one guide roller.

37. Apparatus according to claim 36 wherein said deflection roller means comprises a plurality of parallel deflection rollers parallel to said at least one guide roller, said deflection roller means being spaced from one another and being spaced from said at least one guide roller.

38. Apparatus for conveying continuous collapsed film comprising a guidance means receiving said continuous collapsed film, said guidance means comprising at least one guide roller and a first turning bar for guiding said film, said at least one guide roller changing the direction of the film 180 degrees, said first turning bar changing the direction of the film 180 degrees, conveyor belt means traveling the same speed as said film, said conveyor belt means and said film looping over said one turning bar in superimposed relationship with said conveyor belt means being between said first turning bar and said film such that said conveyor belt means carries said film during said looping over said first turning bar, support means on which said guidance means is mounted, said support means comprising a first holder means, said at least one guide roller being mounted on said first holder means, said support means comprising a second holder means, said first turning bar being mounted on said second holder means, said support means comprising third holder means, a second turning bar mounted on said third holder means, said support means further comprising fourth holder means, and a plurality of belt guide elements mounted on said fourth holder means.

39. Apparatus for conveying continuous collapsed film comprising a guidance means receiving said continuous collapsed film, said guidance means comprising at least one guide roller and a first turning bar for guiding said film, said at least one guide roller changing the direction of the film 180 degrees, said first turning bar changing the direction of the film 180 degrees, conveyor belt means having a first conveyor belt which travels the same speed as said film, said first conveyor belt and said film looping over said first turning bar in superimposed relationship with said first conveyor belt being between said first turning bar and said film such that said first conveyor belt carries said film during said looping over said first turning bar, support means on which said guidance means is mounted, said support means comprising a first holder means, said at least one guide roller being mounted on said first holder means, said support means comprising a second holder means, said first turning bar being mounted on said second holder means, a second turning bar on said second holder means, said first conveyor belt passing over said second belt turning bar, said support means comprising a third holder means, a second turning bar mounted on said third holder means, said conveyor belt means comprising a second conveyor belt, said second conveyor belt and said film looping over said second turning bar in superimposed relationship.

40. Apparatus for conveying continuous collapsed film comprising a guidance means receiving said continuous collapsed film, said guidance means comprising at least one guide roller and at least one turning bar for guiding said film, said at least one guide roller changing the direction of the film 180 degrees, said at least one turning bar changing the direction of the film 180 degrees, conveyor belt means having a conveyor belt which travels the same speed as said film, said conveyor belt and said film looping over said one turning bar in superimposed relationship with said conveyor belt being between said at least one turning bar and said film such that said conveyor belt carries said film during said looping over said at least one turning bar, said conveyor belt having a belt loop portion looping over said one turning bar, said film having a film loop portion looping over said belt loop portion, said film loop portion contacting said belt loop portion over a contacting area, said contacting area being equal to the entire area of said film loop portion such that the entire film loop portion is in contact with said belt loop portion.

41. Apparatus according to claim 40 wherein said conveyor belt has a width which is greater than the width of said film.

42. Apparatus for conveying continuous collapsed film comprising a guidance means receiving said continuous collapsed film, said guidance means comprising at least one guide roller and at least one turning bar for guiding said film, said at least one guide roller changing the direction of the film 180 degrees, said at least one turning bar changing the direction of the film 180 degrees, conveyor belt means traveling the same speed as said film, said conveyor belt means and said film looping over said one turning bar in superimposed relationship with said conveyor belt means being between said at least one turning bar and said film such that said conveyor belt means carries said film during said looping over said at least one turning bar, said at least one guide roller and said at least one turning bar having axes disposed in a horizontal plane, said conveyor belt means comprising first conveyor belt guide rollers disposed above said horizontal plane and second conveyor belt guide rollers disposed below said horizontal plane.

43. Apparatus according to claim 42 wherein said first conveyor belt guide rollers and said second conveyor belt guide rollers are used exclusively to guide said conveyor belt means.

\* \* \* \* \*